Figure 1:
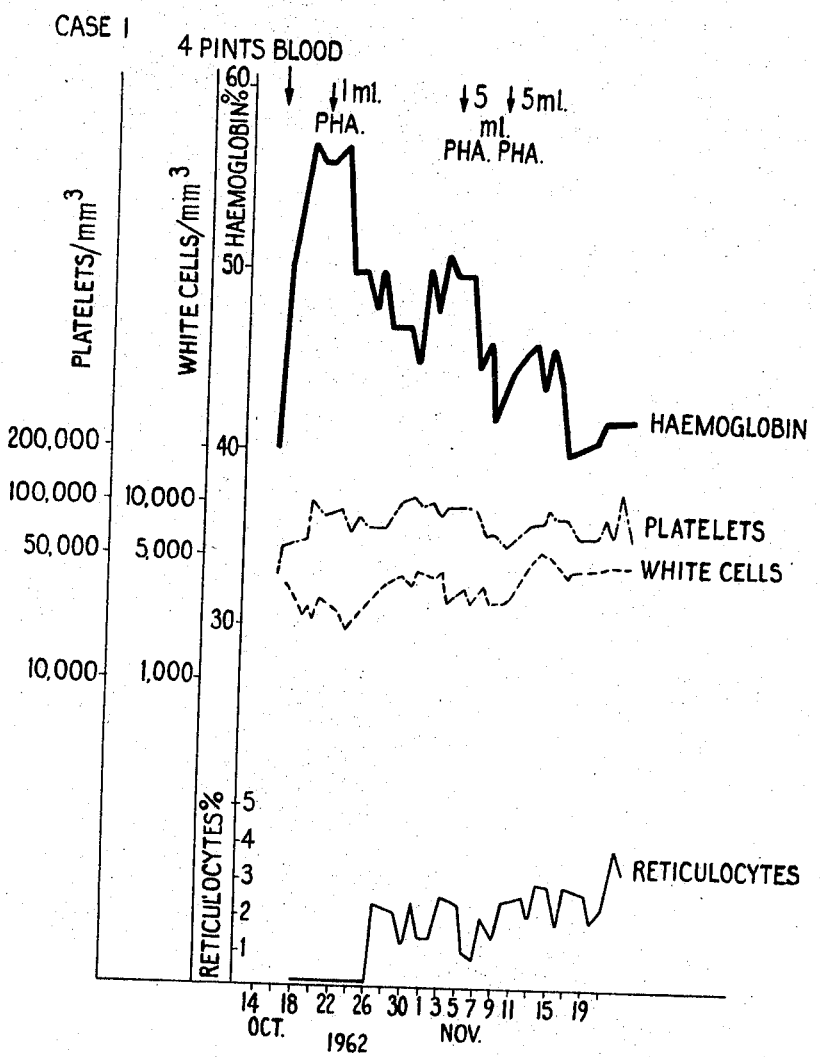

Joseph G. Humble
Inventor

Attorney 3,317,386
METHOD OF TREATING APLASTIC ANAEMIA USING A PREPARATION CONTAINING THE MITOGENIC COMPONENT OF PHYTOHAEMAGGLUTININ
Joseph Graeme Humble, Ashstead, Surrey, England, assignor to Burroughs Wellcome & Co. (U.S.A.) Inc., Tuckahoe, N.Y., a corporation of New York
Filed May 4, 1964, Ser. No. 364,845
2 Claims. (Cl. 167—65)

This invention relates to a novel method of alleviating clinical symptoms in conditions such as aplastic anaemia.

Aplastic anaemia is sometimes idiopathic and sometimes produced inadvertently by treatment with drugs or radiation. It is characterised by the absence from the bone marrow of the normal stem cells and developing blood cells; instead usually large numbers of small lymphocytes are present in the marrow and peripheral blood.

It was first suggested over fifty years ago that such small lymphocytes could differentiate into stem cells. More recently it was observed that lymphocytes in vitro would undergo mitosis and this was found to be stimulated by the phytohaemagglutinin commonly used to separate white cells from red cells of whole blood. In vivo, however, the phytohaemagglutinin produced no haemotological effects when injected into rats, although it appeared to be non-toxic. [M. W. Elves, S. Roath and M. C. G. Israels: "Effects of Phytohaemagglutinin In Vivo in Rats": Nature (1963), 198, 494.]

Phytohaemagglutinin occurs widely in leguminous seeds and is conveniently obtained from beans. The preparations commercially available at the present time are obtained from ground kidney beans (Phaseolus vulgaris) by extracting soluble material with 0.1 N hydrochloric acid and freeze-drying the portion that remains soluble on neutralising to pH 5.8. Further purification of the commercial product can give mitogenic preparations at least twenty times as potent, and the power to agglutinate red cells can be removed without loss of the mitogenic activity.

I have now discovered that a preparation containing the mitogenic component of phytohaemagglutinin is useful in alleviating the symptoms of aplastic anaemia. (Such a preparation is hereinafter called PHA.) After the injection of a clinically effective dose of PHA, aplastic bone marrow begins to be replaced by haematopoietic marrow and the blood counts then gradually return to a more normal value. A series of several daily injections of PHA is usually sufficient to stimulate haematopoiesis, although the effect is not generally manifest until after an interval of several days. If desired, the series of PHA injections may be repeated a few weeks later. By mitogenic component I mean that component of phytohaemagglutinin which stimulates the transformation and rate of multiplication or division of lymphocytes. The invention accordingly comprises a method of treating aplastic anaemia which comprises the administration to the patient of a preparation containing a clinically effective dose of the mutogenic component of phytohaemagglutinin.

If the cause of the aplasia is known, the patient should if possible be guarded against future contact with the causative agent.

A well-known cause is high dosage with anti-neoplastic drugs when the malignant cell proliferation is checked only at the expense of producing aplasia. In these circumstances, treatment with PHA is especially advantageous since it reestablishes haematopoiesis without simultaneously reactivating the neoplastic condition.

The PHA is given parenterally. With the relatively crude preparations obtained by the method of Rigas and Osgood and at present commercially available, it is advisable to ensure intravenous injection and to administer concurrently an antihistamine to prevent anaphylaxis. The use of more highly purified preparations of the mitogenic principle (for example one so purified as no longer to cause agglutination of red cells) renders the treatment less awkward.

The dose required depends on the clinical circumstances of each case, and on the degree of purity of the PHA employed. With a relatively crude preparation obtained by the method of Rigas and Osgood, a series of doses each of 10–100 mg. may be required and doses as high as 4 mg./kg. may be given. Much smaller amounts of highly purified PHA can be used, for example, doses of 0.5–5 mg.; and one can give fewer injections each containing more of the mitogenic component.

The following case histories illustrate the invention.

The PHA preparation used was "Wellcome" brand phytohaemagglutinin (Burroughs Wellcome & Co., London). Each ampoule contained 50 mg. of a sterile freeze-dried extract prepared from the seeds of Phaseolus vulgaris and standarised as to its mitogenic activity. The freeze-dried material from one ampoule was reconstituted with 5 ml. of sterile distilled water and given slowly by intravenous injection, and this dose was given daily up to a total of seven injections. Inadvertent extravenous injection showed it to be somewhat irritant so that the intravenous route was always used. The antihistamine drug 1-(p-chlorophenyl)-1-(2-pyridyl)-3-dimethylaminopropane (chlorpheniramine) was given prophylactically as minor reactions were observed in some cases. Standard haematological procedures were employed.

Figure 2:
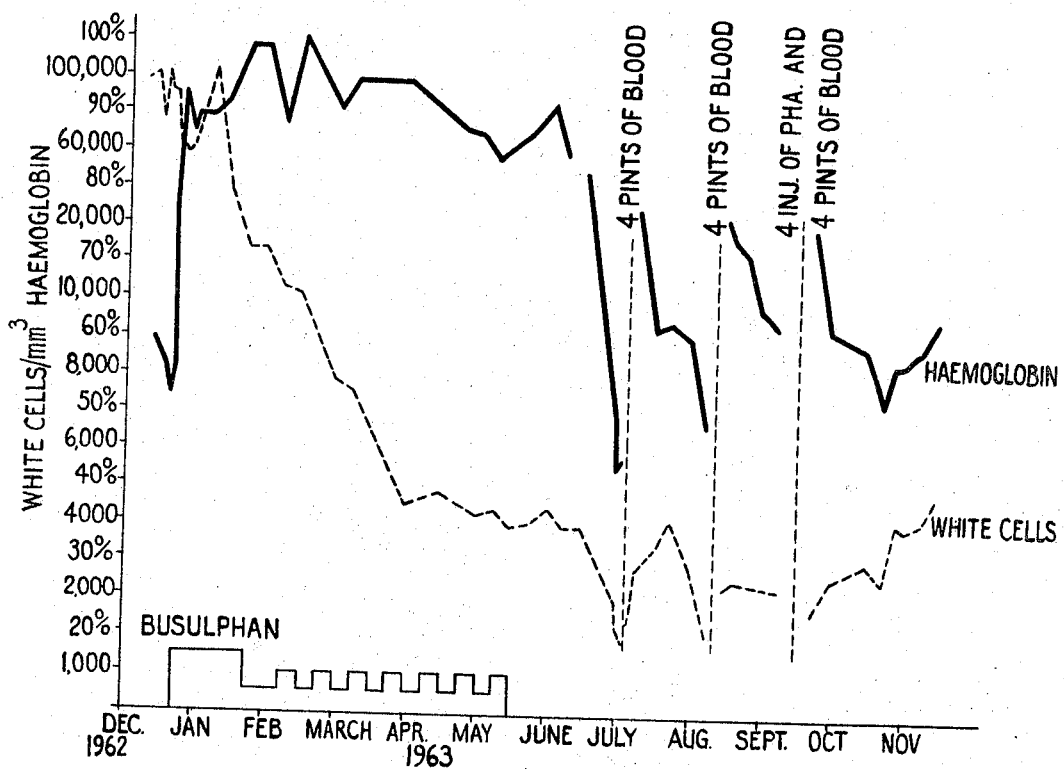
Figure 3:
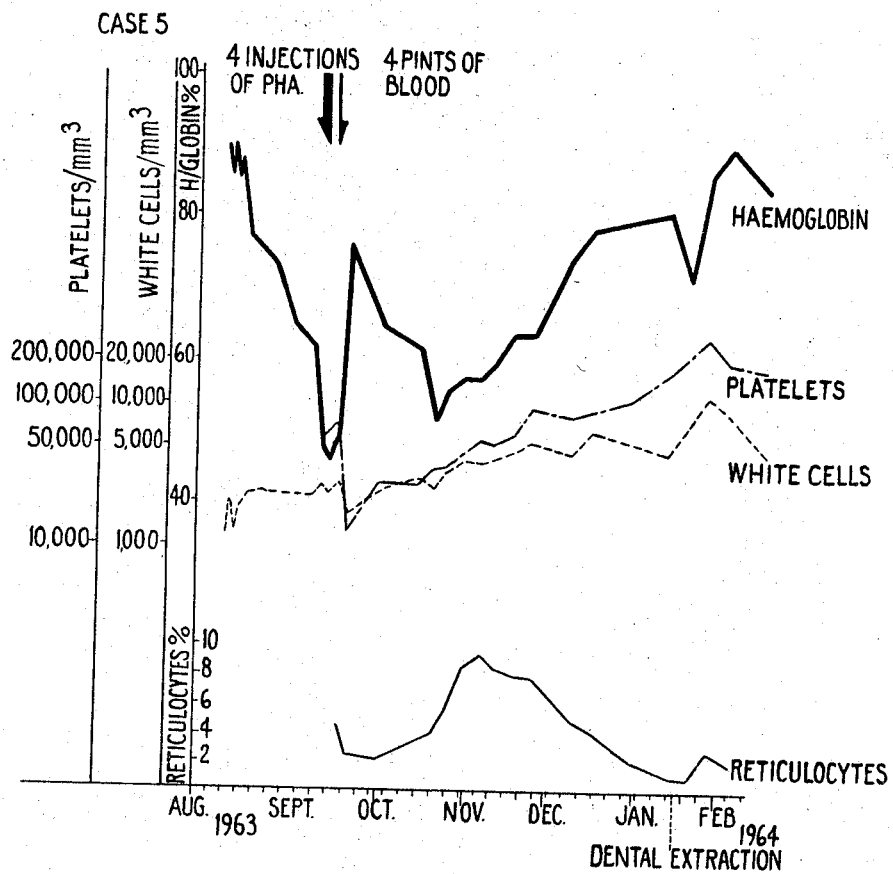

Six cases were treated with the PHA. The cause of the aplasia was different in each (see the table). All the six cases treated showed changes of the type desired in blood or marrow after treatment; four of the six were still alive twelve months after treatment and the recovery in three was good. The changes in blood count with time are shown in the accompanying drawings, where FIGURE 1 relates to Case 1, FIGURES 2 and 3 to Case 5 and FIGURE 4 to Case 6.

TABLE

| Case | Age | Sex | Causative agent | Remission |
| --- | --- | --- | --- | --- |
| 1 | 69 | F | Chlorothiazide | Moderate. |
| 2 | 54 | M | X-rays plus phenylbutazone | Active. |
| 3 | 58 | M | Phenylbutazone | Good. |
| 4 | 45 | M | X-rays | Marrow only. |
| 5 | 27 | F | Busulphan | Good. |
| 6 | 59 | F | Thiotepa | Do. |

Figure 4:
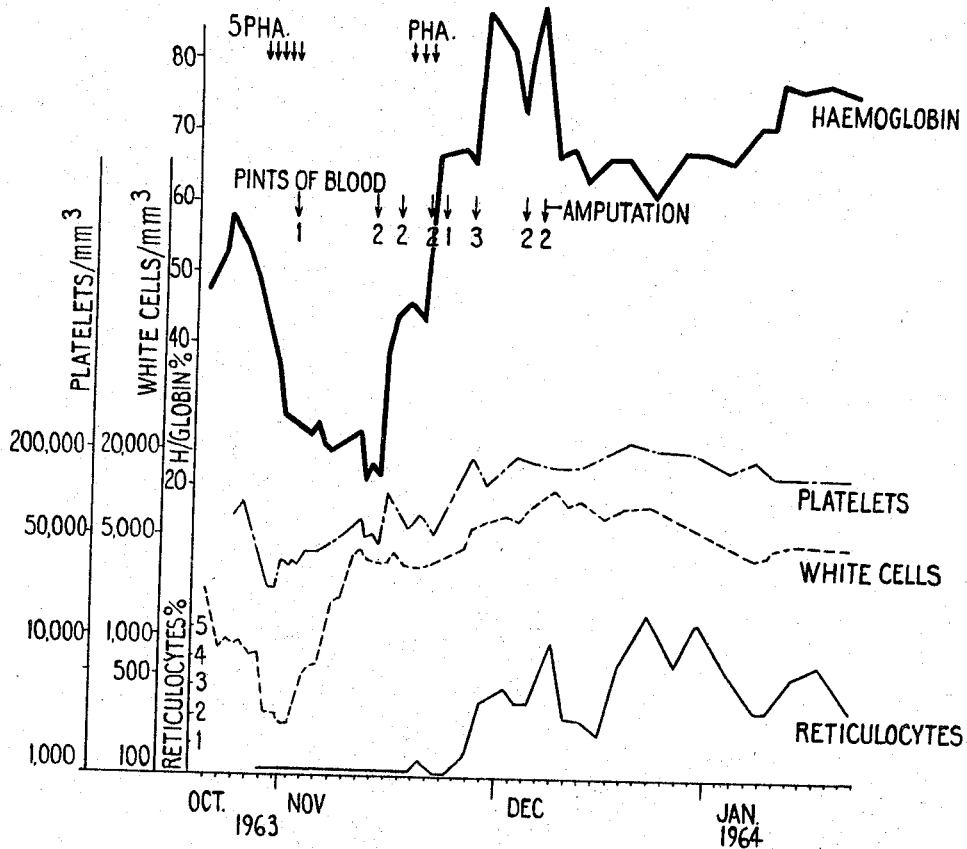

The changes in blood count with time are shown in FIGURE 4 of the drawings.

Six cases of aplastic anaemia were treated clinically with the mitogenic component of phytohaemagglutinin. Evidence of stimulation of bone marrow function was observed in all cases. As indicated in the results of these clinical experiments, the first case, a widow aged 69 found to have hypertensive heart disease and coronary complications was treated with the mitogenic component of phytohaemagglutinin in an amount of 4 mg. per 20 ml. One hour later, the patient had a rigor which responded very rapidly to further treatment with chlorpheniramine. Following this procedure, the platelet count rose to 130,000/mm.$^3$ in twelve days and reticulocytes were found in the film. The patient was thereupon discharged.

Further experiments indicated conclusively, as noted in the summary of the article by Joseph Graeme Humble, M.D., that in all cases stimulation of bone marrow function was present upon administration of the mitogenic component of phytohaemagglutinin.

I claim:
1. A method of treating aplastic anaemia which com- prises the in vivo parenteral administration to the patient of a preparation containing a clinically effective dose of the mitogenic component of phytohaemagglutinin.

2. A method of treating aplastic anaemia which comprises the in vivo parenteral administration to the patient of a preparation in an amount of from 10 to 100 milligrams of the mitogenic component of phytohaemagglutinin.

References Cited by the Examiner

UNITED STATES PATENTS

| | | | |
|---|---|---|---|
| 2,848,366 | 8/1958 | Bertsch | 167—68 |
| 2,957,806 | 10/1960 | Rummel | 167—68 |
| 3,051,625 | 8/1962 | Rao | 167—78 |
| 3,051,626 | 8/1962 | Rao | 167—78 |

OTHER REFERENCES

Beckman et al., Hereditas 48, pp. 619–29 (1962) as abstracted in Chemical Abstracts 59: 6857a (1963).

Chemical Abstracts 59: 14456b (1963).

Dorland, The American Illustrated Medical Dictionary, 18th ed., 1938; W. B. Saunders Company, Philadelphia, p. 94.

ALBERT T. MEYERS, *Primary Examiner.*

JEROME D. GOLDBERG, *Assistant Examiner.*